United States Patent
Drange

(10) Patent No.: US 7,447,238 B2
(45) Date of Patent: Nov. 4, 2008

(54) METHOD FOR COMPENSATING FOR INTERNAL DELAYS WITHIN EACH NODE AND TRANSMISSION DELAYS BETWEEN THE NODES

(75) Inventor: Geir Andre Motzfeldt Drange, Asker (NO)

(73) Assignee: WesternGeco L.L.C., Houston, TX (US)

( * ) Notice: Subject to any disclaimer, the term of this patent is extended or adjusted under 35 U.S.C. 154(b) by 640 days.

(21) Appl. No.: 11/115,019

(22) Filed: Apr. 26, 2005

(65) Prior Publication Data

US 2006/0239301 A1 Oct. 26, 2006

(51) Int. Cl.
*H04J 3/06* (2006.01)
(52) U.S. Cl. ..................................... 370/507
(58) Field of Classification Search ............... 370/324, 370/350, 503, 507, 508, 509, 510, 511, 512, 370/513, 514, 516, 517, 518, 519, 498
See application file for complete search history.

(56) References Cited

U.S. PATENT DOCUMENTS

| | | | |
|---|---|---|---|
| 4,926,446 A * | 5/1990 | Grover et al. ............... 375/358 |
| 5,331,632 A | 7/1994 | Aaron et al. | |
| 5,379,299 A | 1/1995 | Schwartz | |
| 5,546,023 A | 8/1996 | Borkar et al. | |
| 5,548,562 A | 8/1996 | Helgerud et al. | |
| 5,640,388 A * | 6/1997 | Woodhead et al. .......... 370/468 |
| 5,724,241 A | 3/1998 | Wood et al. | |
| 5,978,313 A | 11/1999 | Longaker | |
| 6,002,339 A | 12/1999 | Norris | |
| 6,594,284 B1 | 7/2003 | Page et al. | |

(Continued)

FOREIGN PATENT DOCUMENTS

JP 2000-10902 1/2000

(Continued)

OTHER PUBLICATIONS

UK Search Report dated Aug. 3, 2006 for Application No. GB 0607476.9.

*Primary Examiner*—Ricky Ngo
*Assistant Examiner*—Wei-Po Kao
(74) *Attorney, Agent, or Firm*—Ari Pramudji; Liangang (Mark) Ye; Jeffrey E. Griffin

(57) ABSTRACT

A method for compensating for one or more transmission delays between a multiplexer, a first node and a second node. In one embodiment, the method includes synchronizing a first real time clock of the multiplexer as the real time clock of the first node and as the real time clock of the second node; receiving data from the first node; calculating a transmission delay between the multiplexer and the first node using an equation $(RTC_K + Delay_K) \mod (M \cdot T_{slot}) = (K-1) \cdot T_{slot}$, where M refers to the number of time slots within a bandwidth of a medium configured for communicating data between the multiplexer, the first node and the second node, $T_{slot}$ refers to the duration of each time slot, K refers to a node address, mod refers to a modulo operation, $RTC_K$ refers to the real time clock of the $K^{th}$ node and $Delay_K$ refers to accumulated transmission delay from the multiplexer to the $K^{th}$ node; sending a second real time clock of the multiplexer, a first number and the transmission delay to the first node; and setting the real time clock of the first node to be equal to the second real time clock of the multiplexer plus the transmission delay.

15 Claims, 3 Drawing Sheets

U.S. PATENT DOCUMENTS

| | | | |
|---|---|---|---|
| 6,671,291 B1 * | 12/2003 | Soliman | 370/503 |
| 6,816,510 B1 * | 11/2004 | Banerjee | 370/503 |
| 2002/0003799 A1 * | 1/2002 | Tomita | 370/392 |
| 2002/0188781 A1 | 12/2002 | Schoch et al. | |
| 2003/0152110 A1 | 8/2003 | Rune | |
| 2003/0202424 A1 | 10/2003 | Burkholder et al. | |
| 2003/0214977 A1 * | 11/2003 | Kuo | 370/503 |
| 2005/0201399 A1 * | 9/2005 | Woodward et al. | 370/412 |
| 2006/0080575 A1 | 4/2006 | Golparian | |
| 2006/0193332 A1 * | 8/2006 | Qian et al. | 370/397 |

FOREIGN PATENT DOCUMENTS

| | | | |
|---|---|---|---|
| WO | WO 2004049006 A1 | 6/2004 | |

* cited by examiner

METHOD FOR COMPENSATING FOR INTERNAL DELAYS WITHIN EACH NODE AND TRANSMISSION DELAYS BETWEEN THE NODES

BACKGROUND OF THE INVENTION

1. Field of the Invention

Various embodiments of the present invention generally relate to a network environment, and more particularly, to addressing delays within the network environment.

2. Description of the Related Art

Time division multiplexing (TDM) is a technique for splitting a bandwidth (link capacity) into several channels to allow bit streams to be combined (multiplexed). The bandwidth allocation is done by dividing the time axis into fixed-length slots. A particular channel can then transmit only during a specific time slot. The circuit that combines signals at the source (transmitting) end of a communications link may be referred to as a multiplexer. It accepts an input from each individual end user, breaks each signal into segments, and assigns the segments to a composite signal in a rotating, repeating sequence. The composite signal thus contains data from multiple senders.

Many network environments that use time division multiplexing in accordance with the above description, however, suffer from bandwidth loss caused by internal delays within each node and transmission delays between the nodes.

Accordingly, a need exists in the art for a method for compensating for internal delays within each node and transmission delays between the nodes.

SUMMARY OF THE INVENTION

Various embodiments of the invention are directed to a method for synchronizing a real time clock of a first node and a real time clock of a second node with a real time clock of a multiplexer. The method includes sending the real time clock of the multiplexer and a first number to the first node; setting the real time clock of the first node to be equal to the real time clock of the multiplexer; generating a second number; sending the real time clock of the multiplexer and the second number to the second node; and setting the real time clock of the second node to be equal to the real time clock of the multiplexer.

Various embodiments of the invention are also directed to a method for compensating for one or more transmission delays between a multiplexer, a first node and a second node. In one embodiment, the method includes calculating a transmission delay between the multiplexer and the first node using an equation $(RTC_K + Delay_K) \mod (M \cdot T_{slot}) = (K-1) \cdot T_{slot}$, where M refers to the number of time slots within a bandwidth of a medium configured for communicating data between the multiplexer, the first node and the second node, $T_{slot}$ refers to the duration of each time slot, K refers to a node address, mod refers to a modulo operation, $RTC_K$ refers to the real time clock of the $K^{th}$ node and $Delay_K$ refers to accumulated transmission delay from the multiplexer to the $K^{th}$ node; sending the real time clock of the multiplexer, a first number and the transmission delay to the first node; and setting the real time clock of the first node to be equal to the real time clock of the multiplexer plus the transmission delay.

In another embodiment, the method includes synchronizing a first real time clock of the multiplexer as the real time clock of the first node and as the real time clock of the second node; receiving data from the first node; calculating a transmission delay between the multiplexer and the first node using an equation $(RTC_K + Delay_K) \mod (M \cdot T_{slot}) = (K-1) \cdot T_{slot}$, where M refers to the number of time slots within a bandwidth of a medium configured for communicating data between the multiplexer, the first node and the second node, $T_{slot}$ refers to the duration of each time slot, K refers to a node address, mod refers to a modulo operation, $RTC_K$ refers to the real time clock of the $K^{th}$ node and $Delay_K$ refers to accumulated transmission delay from the multiplexer to the $K^{th}$ node; sending a second real time clock of the multiplexer, a first number and the transmission delay to the first node; and setting the real time clock of the first node to be equal to the second real time clock of the multiplexer plus the transmission delay.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
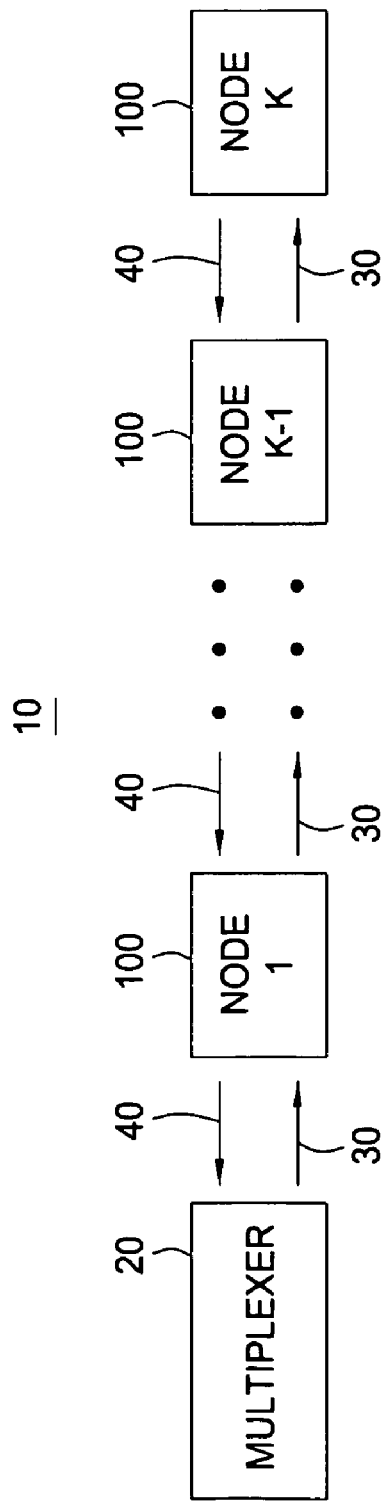
FIG. 1 illustrates a network environment in accordance with one or more embodiments of the present invention.

FIG. 1 illustrates a network environment 10 in accordance with one or more embodiments of the present invention. In one embodiment, the network environment 10 includes a multiplexer 20 in communication with a plurality of nodes 100. FIG. 1 illustrates that the network environment 10 has K number of nodes, wherein K can be any number greater than one. Each node may be a sensor, computer, server, wireless device, personal digital assistant, or any other device that may benefit from being connected in a manner according to the network environment 10. The network environment 10 may be a seismic data acquisition system network. The multiplexer 20 and the nodes 100 are coupled to each other in a daisy chain configuration. As such, the multiplexer 20 may commonly be referred to as a terminator. All of the nodes 100 receive identical signals and each node in the chain may modify one or more signals before passing them on to the next node. The signals may be communicated between the nodes 100 and the multiplexer 20 through any transmission medium, such as fiber optic cable or electrical wire.

A two way communication exists between adjacent nodes 100. Signals that are transmitted from the multiplexer 20 to the nodes 100 may be communicated through a command link 30, which may use a continuous frame based format. Signals that are transmitted from the nodes 100 to the multiplexer 20 may be communicated through a data link 40, which may use time division multiplexing (TDM). Each node 100 may have a dedicated time slot for data transmission. Other embodiments, however, contemplate that each node 100 may have more than one dedicated time slot for data transmission.

Figure 3:
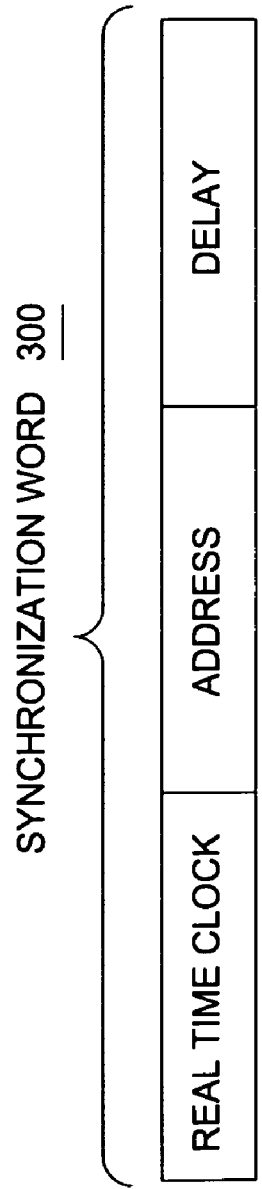
FIG. 3 illustrates a synchronization word in accordance with one or more embodiments of the invention.
Figure 2:
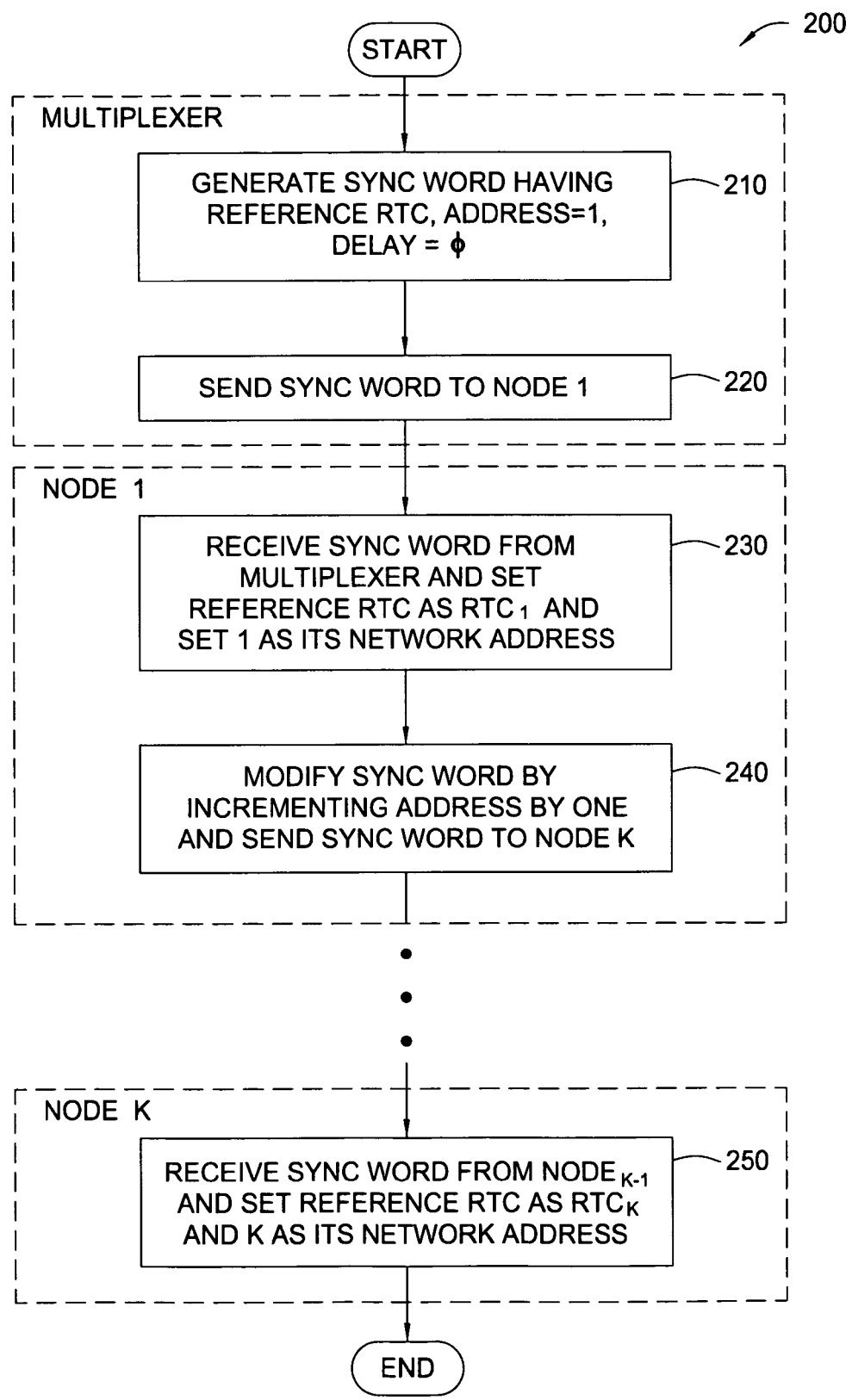
FIG. 2 illustrates a flow diagram of a method for synchronizing the real time clock of each node within the network environment with the real time clock of the multiplexer in accordance with one or more embodiments of the invention.

FIG. 2 illustrates a flow diagram of a method 200 for synchronizing the real time clock of each node within the network environment 10 with the real time clock of the multiplexer 20 in accordance with one or more embodiments of the invention. At step 210, the multiplexer 20 generates a synchronization word. FIG. 3 illustrates a synchronization word 300 in accordance with one or more embodiments of the invention. The synchronization word 300 includes three fields: a real time clock field, an address field and a delay field. The real time clock field is filled with the real time clock of the multiplexer 20, which may be synchronized with a global real time clock, e.g., GPS real time clock. As such, the real time clock of the multiplexer 20 may be referred to as the reference real time clock. The address field is filled with 1, which corresponds with the first node. The address field may be in any format generally known by persons of ordinary skill in the art, e.g., binary or decimal. The delay field is empty. At step 220, the multiplexer 20 sends the synchronization word to node 1. The synchronization word may be transmitted continuously through the communication link 30. In one embodiment, the synchronization word may be transmitted with a fixed interval that may be equal to or greater than the command frame interval.

At step 230, upon receipt of the synchronization word, node 1 latches the reference real time clock and sets the reference real time clock as its real time clock. Node 1 also latches the content of the address field and sets the content, i.e., 1, as its network address. At step 240, node 1 modifies the synchronization word by incrementing the content of the address field by one, i.e., 2, and relay the synchronization word to the next node in the chain. In this manner, node 1 generates another number to be used as a network address for the next node. The above referenced steps are repeated until all the nodes 100 within the network environment 10 have set the reference real time clock as their real time clocks. That is, until node K receives the synchronization word from node $_{K-1}$, latches the reference real time clock and sets the reference real time clock as its real time clock and sets K as its network address (step 250).

Figure 4:
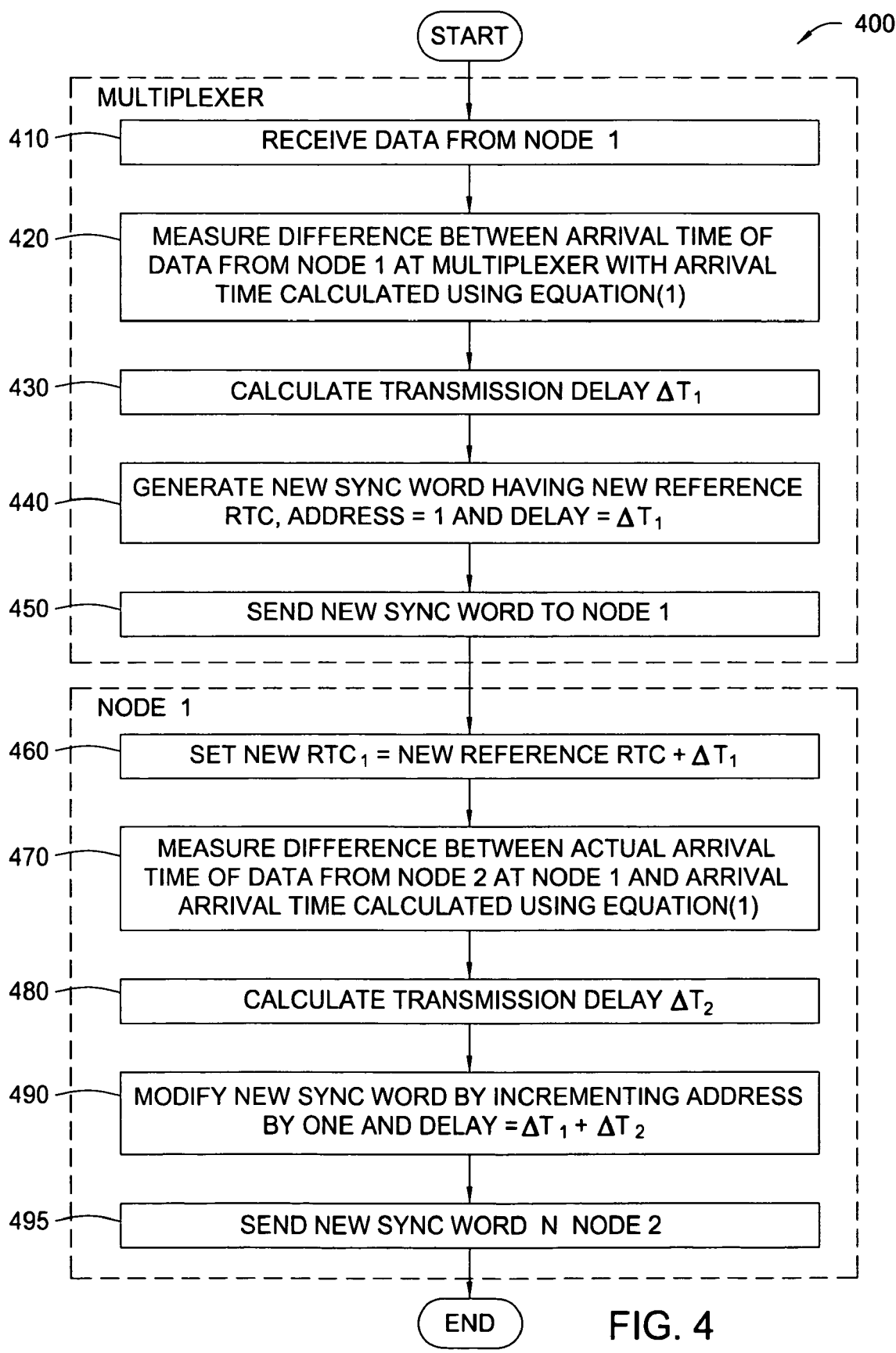
FIG. 4 illustrates a flow diagram of a method for compensating for transmission delays between a multiplexer and each node within the network environment in accordance with one or more embodiments of the invention.

Referring back to step 210, once the multiplexer 20 sends the synchronization word to node 1, the multiplexer 20 waits to receive data from the nodes, including node 1. FIG. 4 illustrates a flow diagram of a method 400 for compensating for transmission delays between a multiplexer and each node within the network environment 10 in accordance with one or more embodiments of the invention. Upon receipt of data from node 1 (step 410), the multiplexer 20 measures the difference between the actual arrival time of the data from node 1 at the multiplexer 20 and the arrival time calculated using the following equation:

$$(RTC_K + Delay_K) \bmod (M \cdot T_{slot}) = (K-1) \cdot T_{slot} \quad \text{Equation (1)},$$

where M refers to the number of time slots within the bandwidth, $T_{slot}$ refers to the duration of each time slot, K refers to the node address, $RTC_K$ refers to the real time clock of the $K^{th}$ node; mod refers to a modulo operation and $Delay_K$ refers to accumulated transmission delay from multiplexer 20 to the $K^{th}$ node (step 420). For purposes of equation (1), the multiplexer 20 may be referred to as a node with K=0 and the multiplexer 20 uses the reference real time clock as $RTC_K$. At step 430, the multiplexer 20 calculates for $\Delta t_1$, which is the transmission delay between the multiplexer 20 and node 1, using the difference measured at step 420. The transmission delay $\Delta t_1$ may also include any delay that occurs inside node 1 associated with its internal data processing. In one embodiment, transmission delay $\Delta t_1$ may be calculated as the difference measured at step 420 divided by 2.

At step 440, the multiplexer 20 generates a new synchronization word, which includes a real time clock field that is filled with a new reference real time clock (e.g., at the moment the synchronization word is generated), an address field filled with 1 and a delay field filled with transmission delay $\Delta t_1$. At step 450, the multiplexer 20 sends the new synchronization word to node 1.

At step 460, upon receipt of the new synchronization word from the multiplexer 20, node 1 sets the new reference real time clock plus transmission delay $\Delta t_1$ as its new real time clock. Node 1 also latches the content of the address field and sets the content, i.e., 1, as its network address.

At step 470, node 1 measures the difference between the actual arrival time of the data from node 2 at node 1 and the arrival time calculated using equation (1). At step 480, node 1 calculates for $\Delta t_2$, which is the transmission delay between the node 1 and node 2, using the difference measured at step 470. At step 490, node 1 modifies the new synchronization word by incrementing the address field by one and setting the delay field=$\Delta t_1 + \Delta t_2$, which may include any delay caused by internal processing of node 1 and node 2. At step 495, node 1 sends the new synchronization word to node 2.

Processing continues until all the nodes 100 within the network environment 10 have set the new reference real time clock plus their respective accumulative transmission delay as their respective real time clocks. Once each node has set the new reference real time clock plus its respective accumulative transmission delay $\Delta t$ as its real time clock, each node may transmit data to the multiplexer 20 earlier by its respective accumulative transmission delay $\Delta t$. For instance, once node 1 sets the new reference real time clock plus transmission delay $\Delta t_1$ as its new real time clock, node 1 may transmit data to the multiplexer 20 earlier by transmission delay $\Delta t_1$. Likewise, once node 2 sets the new reference real time clock plus transmission delay $\Delta t_1 + \Delta t_2$ as its new real time clock, node 2 may transmit data to the multiplexer 20 earlier by transmission delay $\Delta t_1 + \Delta t_2$. Thus, when the multiplexer 20 receives the data from each node, the actual arrival time of the data from each node will be substantially the same as the arrival time calculated using the equation (1). In this manner, various embodiments of the invention use transmission delay compensation to maximize bandwidth utilization.

While the foregoing is directed to embodiments of the present invention, other and further embodiments of the invention may be devised without departing from the basic scope thereof, and the scope thereof is determined by the claims that follow.

What is claimed is:

1. A method for compensating for one or more transmission delays between a multiplexer, a first node and a second node, comprising:

calculating a transmission delay between the multiplexer and the first node using an equation $(RTC_K + Delay_K) \bmod (M \cdot T_{slot}) = (K-1) \cdot T_{slot}$, where M refers to the number of time slots within a bandwidth of a medium configured for communicating data between the multiplexer, the first node and the second node, $T_{slot}$ refers to the duration of each time slot, K refers to a node address, mod refers to a modulo operation, $RTC_K$ refers to the real time clock of the $K^{th}$ node and $Delay_K$ refers to accumulated transmission delay from the multiplexer to the $K^{th}$ node;

sending the real time clock of the multiplexer, a first number and the transmission delay to the first node; and setting the real time clock of the first node to be equal to the real time clock of the multiplexer plus the transmission delay.

2. The method of claim 1, further comprising sending data to the multiplexer earlier by an amount of time defined by the transmission delay.

3. The method of claim 1, further comprising calculating a transmission delay between the first node and the second node using the equation.

4. The method of claim 3, further comprising:
incrementing the first number by one to generate a second number; and
sending to the second node the real time clock of the multiplexer, the second number, the transmission delay between the multiplexer and the first node, and the transmission delay between the first node and the second node.

5. The method of claim 4, further comprising setting the real time clock of the second node to be equal to the real time clock of the multiplexer plus the transmission delay between the multiplexer and the first node plus the transmission delay between the first node and the second node.

6. The method of claim 5, further comprising sending data to the multiplexer earlier by an amount of time defined by the transmission delay between the multiplexer and the first node plus the transmission delay between the first node and the second node.

7. The method of claim 1, wherein the transmission delay comprises a delay caused by an internal processing of data within the first node.

8. The method of claim 1, wherein calculating the transmission delay between the multiplexer and the first node comprises measuring the difference between the arrival time of data from the first node at the multiplexer and the arrival time calculated using the equation.

9. The method of claim 8, wherein calculating the transmission delay between the multiplexer and the first node further comprises calculating the transmission delay between the multiplexer and the first node using the measured difference.

10. The method of claim 1, further comprising setting a network address for the first node to be equal to the first number.

11. The method of claim 3, wherein calculating the transmission delay between the first node and the second node comprises measuring the difference between the arrival time of data from the second node at the first node and the arrival time calculated using from the equation.

12. The method of claim 11, wherein calculating the transmission delay between the first node and the second node further comprises calculating the transmission delay between the first node and the second node using the measured difference.

13. A method for compensating for one or more transmission delays between a multiplexer, a first node and a second node, comprising:
synchronizing a first real time clock of the multiplexer as the real time clock of the first node and as the real time clock of the second node;
receiving data from the first node;
calculating a transmission delay between the multiplexer and the first node using an equation $(RTC_K + Delay_K) \bmod(M \cdot T_{slot}) = (K-1) \cdot T_{slot}$, where M refers to the number of time slots within a bandwidth of a medium configured for communicating data between the multiplexer, the first node and the second node, $T_{slot}$ refers to the duration of each time slot, K refers to a node address, mod refers to a modulo operation, $RTC_K$ refers to the real time clock of the $K^{th}$ node and $Delay_K$ refers to accumulated transmission delay from the multiplexer to the $K^{th}$ node;
sending a second real time clock of the multiplexer, a first number and the transmission delay to the first node; and
setting the real time clock of the first node to be equal to the second real time clock of the multiplexer plus the transmission delay.

14. The method of claim 13, further comprising sending data to the multiplexer earlier by an amount of time defined by the transmission delay.

15. The method of claim 13, wherein synchronizing the first real time clock of the multiplexer as the real time clock of the first node and as the real time clock of the second node comprises:
sending the first real time clock of the multiplexer and the first number to the first node;
setting the real time clock of the first node as the first real time clock of the multiplexer;
generating a second number;
sending the first real time clock of the multiplexer and the second number to the second node; and
setting the real time clock of the second node to be equal to the first real time clock of the multiplexer.

* * * * *